(12) United States Patent
Dave et al.

(10) Patent No.: US 9,619,532 B2
(45) Date of Patent: Apr. 11, 2017

(54) COLLABORATIVE LOCATION-BASED SEARCH RESULTS

(71) Applicant: Apple Inc., Cupertino, CA (US)

(72) Inventors: Swapnil R. Dave, Santa Clara, CA (US); Kaustubh M. Rao, Santa Clara, CA (US)

(73) Assignee: APPLE, INC., Cupertino, CA (US)

( * ) Notice: Subject to any disclaimer, the term of this patent is extended or adjusted under 35 U.S.C. 154(b) by 102 days.

(21) Appl. No.: 14/602,194

(22) Filed: Jan. 21, 2015

(65) Prior Publication Data

US 2015/0134646 A1 May 14, 2015

Related U.S. Application Data

(63) Continuation of application No. 13/678,471, filed on Nov. 15, 2012, now Pat. No. 8,965,407.

(51) Int. Cl.
*G06F 17/30* (2006.01)
*H04W 4/02* (2009.01)
*H04W 4/20* (2009.01)

(52) U.S. Cl.
CPC .. *G06F 17/30554* (2013.01); *G06F 17/30061* (2013.01); *H04W 4/025* (2013.01); *H04W 4/206* (2013.01)

(58) Field of Classification Search
None
See application file for complete search history.

(56) References Cited

U.S. PATENT DOCUMENTS

| | | | |
|---|---|---|---|
| 8,090,732 B2 | 1/2012 | Mok et al. | |
| 8,204,513 B2 | 6/2012 | Crowley et al. | |
| 8,965,407 B2 | 2/2015 | Dave et al. | |
| 9,179,258 B1* | 11/2015 | Siegel | H04W 4/023 |
| 2008/0214204 A1 | 9/2008 | Ramer et al. | |
| 2009/0100037 A1 | 4/2009 | Scheibe | |
| 2009/0248663 A1 | 10/2009 | Maniyar et al. | |
| 2009/0280824 A1* | 11/2009 | Rautiainen | G01S 5/14 |
| | | | 455/456.1 |
| 2011/0142016 A1* | 6/2011 | Chatterjee | G06Q 30/02 |
| | | | 370/338 |

* cited by examiner

*Primary Examiner* — Daniel Lai
(74) *Attorney, Agent, or Firm* — Kilpatrick Townsend & Stockton LLP (57) ABSTRACT

Multiple mobile devices can be enabled to collaboratively search online information databases for results that may be interesting to all of them. Such search results can involve places of interest at which all of the search participants can conveniently meet due to the locations of those results being near to all of the search participants, for example.

26 Claims, 7 Drawing Sheets

COLLABORATIVE LOCATION-BASED SEARCH RESULTS

CROSS-REFERENCES TO RELATED APPLICATIONS

This application claims priority under 35 U.S.C. §120 as a continuation of U.S. application Ser. No. 13/678,471, filed Nov. 15, 2012, which is incorporated by reference herein for all purposes.

BACKGROUND

The present disclosure relates generally to mobile devices, and in particular to techniques for using mobile devices to obtain search results based on the locations of those mobile devices.

Computers and other electronic devices can communicate with each other over networks such as local area networks, wide area networks, and the Internet. Mobile devices such as cell phones, including so-called smart phones, can communicate with each other wirelessly over a variety of wireless networks including 3G and 4G networks. Such mobile devices also can communicate over the Internet with remote servers using protocols such as Transmission Control Protocol (TCP), Internet Protocol (IP), and Hypertext Transfer Protocol (HTTP).

Mobile devices enable people (or "users") to communicate with each other from a variety of different locations. The portable nature of mobile devices makes possible remote interactions between multiple people as those people move from place to place. During any given remote interaction between a pair of people using mobile devices to communicate with each other, those people can be located at places far away from the places at which they were located during previous interactions. Such interactions can be audio only, or text only, or can involve some combination of motion video and audio—as in the case of Facetime conversations conducted between two iPhones.

Although such remote interactions are a convenient means of keeping in contact with friends who are not in a person's immediate vicinity, at times, people remotely communicating with each other using mobile devices can sometimes desire to meet physically at some mutually agreeable location in order to engage in activities that are not typically possible when those people are at significant distances from each other. For example, two friends might want to get together to share dinner. Choosing a mutually agreeable location can be a more involved process than might be initially suspected. When two friends are conducting a conversation using their mobile devices, they might each need to inform each other verbally—either through text or vocal communication—where the other one currently is. This process can become more complicated if the description of either friend's current location is not immediately recognizable to the other, as is often the case where the listener has never been to the place that his friend is describing.

Even after the friends have obtained some notion of where the other is located, neither of them might have the faintest notion of suitable establishments to which both of them could travel within a reasonable amount of time. One or both of them might be unfamiliar with the area. If a dinner meeting is planned, then the friends might not know which restaurants are in the area.

SUMMARY

Certain embodiments of the present invention can enable multiple mobile devices to collaboratively search online information databases for results that may be interesting to all of them. Such search results can involve places of interest at which all of the search participants can conveniently meet due to the locations of those results being near to all of the search participants, for example.

The following detailed description together with the accompanying drawings will provide a better understanding of the nature and advantages of the present invention.

BRIEF DESCRIPTION

DETAILED DESCRIPTION

Figure 1:
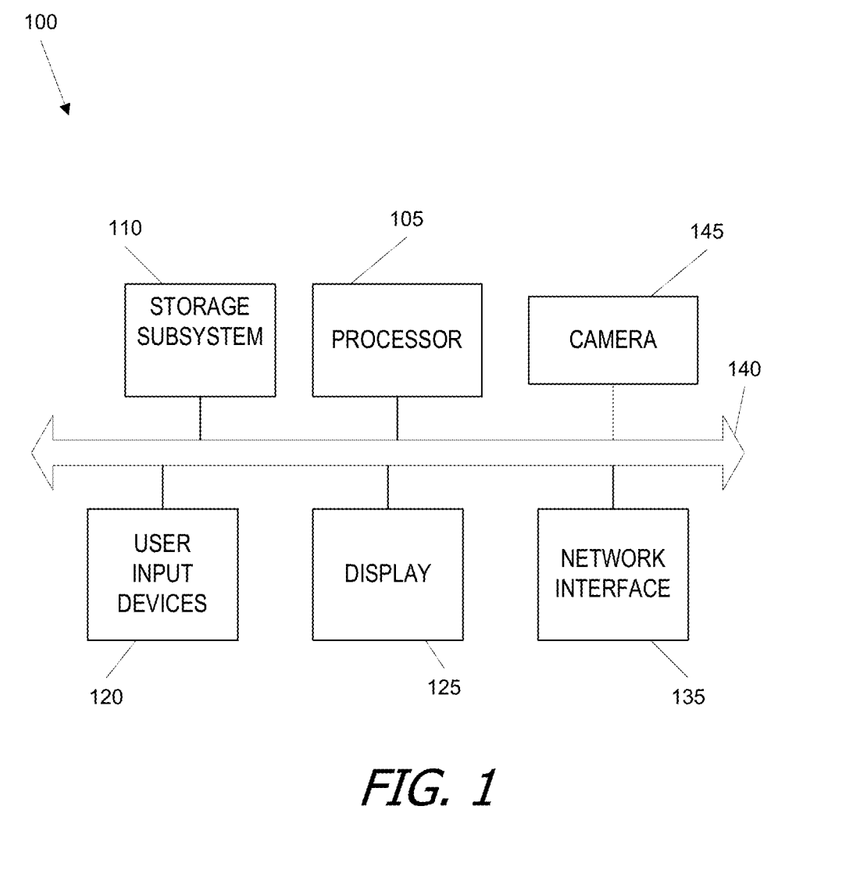
FIG. 1 is a block diagram of a computer system according to an embodiment of the present invention.

FIG. 1 illustrates a computing system 100 according to an embodiment of the present invention. Computing system 100 can be implemented as any of various computing devices, including, e.g., a desktop or laptop computer, tablet computer, smart phone, personal data assistant (PDA), or any other type of computing device, not limited to any particular form factor. Computing system 100 can include processing unit(s) 105, storage subsystem 110, input devices 120, display 125, network interface 135, and bus 140. Computing system 100 can be an iPhone or an iPad.

Processing unit(s) 105 can include a single processor, which can have one or more cores, or multiple processors. In some embodiments, processing unit(s) 105 can include a general-purpose primary processor as well as one or more special-purpose co-processors such as graphics processors, digital signal processors, or the like. In some embodiments, some or all processing units 105 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a permanent storage device. The ROM can store static data and instructions that are needed by processing unit(s) 105 and other modules of computing system 100. The permanent storage device can be a read-and-write memory device. This permanent storage device can be a non-volatile memory unit that stores instructions and data even when computing system 100 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 110 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blu-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 110 can store one or more software programs to be executed by processing unit(s) 105. "Software" refers generally to sequences of instructions that, when executed by processing unit(s) 105 cause computing system 100 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieves program instructions to execute and data to process in order to execute various operations described herein.

A user interface can be provided by one or more user input devices 120, display device 125, and/or and one or more other user output devices (not shown). Input devices 120 can include any device via which a user can provide signals to computing system 100; computing system 100 can interpret the signals as indicative of particular user requests or information. In various embodiments, input devices 120 can include any or all of a keyboard, touch pad, touch screen, mouse or other pointing device, scroll wheel, click wheel, dial, button, switch, keypad, microphone, and so on.

Display 125 can display images generated by computing system 100 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 125. Examples include indicator lights, speakers, tactile "display" devices, printers, and so on.

In some embodiments, the user interface can provide a graphical user interface, in which visible image elements in certain areas of display 125 are defined as active elements or control elements that the user can select using user input devices 120. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in display 125. Other user interfaces can also be implemented.

Network interface 135 can provide voice and/or data communication capability for computing system 100. In some embodiments, network interface 135 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 135 can provide wired network connectivity (e.g., Ethernet) in addition to or instead of a wireless interface. Network interface 135 can be implemented using a combination of hardware (e.g., antennas, modulators/demodulators, encoders/decoders, and other analog and/or digital signal processing circuits) and software components.

Bus 140 can include various system, peripheral, and chipset buses that communicatively connect the numerous internal devices of computing system 100. For example, bus 140 can communicatively couple processing unit(s) 105 with storage subsystem 110. Bus 140 also connects to input devices 120 and display 125. Bus 140 also couples computing system 100 to a network through network interface 135. In this manner, computing system 100 can be a part of a network of multiple computer systems (e.g., a local area network (LAN), a wide area network (WAN), an Intranet, or a network of networks, such as the Internet. Any or all components of computing system 100 can be used in conjunction with the invention.

A camera 145 also can be coupled to bus 140. Camera 145 can be mounted on a side of computing system 100 that is on the opposite side of the mobile device as display 125. Camera 145 can be mounted on the "back" of such computing system 100. Thus, camera 145 can face in the opposite direction from display 125.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 105 can provide various functionality for computing system 100. For example, processing unit(s) 105 can execute a location-based collaborative search application. In some embodiments, the location-based collaborative search application is a software-based process that can exchange geographical location information over networks with other devices and use that geographical location information to locate search results that are proximate to all of the locations represented.

It will be appreciated that computing system 100 is illustrative and that variations and modifications are possible. Computing system 100 can have other capabilities not specifically described here (e.g., mobile phone, global positioning system (GPS), power management, one or more cameras, various connection ports for connecting external devices or accessories, etc.). Further, while computing system 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

According to an embodiment of the invention, a mobile device such as a cell phone presents a user interface element which, when selected by the mobile device's user, causes a cooperative search for a particular type of establishment or geographical feature to be conducted concurrently at that mobile device and at another mobile device. Under one scenario, user selection of the user interface element during a communication session being conducted between two mobile devices causes both of those mobile devices to perform such a search in concert with the other. In performing the search, both mobile devices concurrently attempt to locate an instance of the particular type of establishment or geographical feature that is in the vicinity of both mobile devices. For example, given circular areas surrounding each mobile device, those areas having a specified radius, the mobile devices might search for instances that lie within the intersection of those circular areas, so that the users of each mobile device could potentially travel to those instances within a reasonable amount of time.

In one embodiment of the invention, the user who causes his mobile device to initiate the cooperative search of the kind discussed above can also specify, through his mobile device, the type of establishment or geographical feature for which the mobile devices should search. For example, the user might indicate, through a graphical or voice-recognizing interface, that the user wants to find Mexican restaurants that are within the mutual vicinity of both mobile device users. In one embodiment of the invention, the user who causes his mobile device to initiate the cooperative search of the kind discussed above can also specify, through his mobile device, the maximum distance from either mobile device that acceptable qualifying search results are permitted to be. In other words, the user can specify the maximum radius of the device-surrounding circular areas in whose intersection acceptable qualifying instances are to be found.

In one embodiment of the invention, in response to a user's selection of the user interface element discussed above, and in response to the determination of acceptable search results by each mobile device involved in the cooperative search, both mobile devices participating in the cooperative search present, to their users, a list of the search results that satisfied the search criteria—such criteria potentially including the criterion that those results be located within a specified distance of each of the mobile devices.

In one embodiment of the invention, both mobile devices present the same list, although details associated with the search results in each list, such as the distance of each result from a particular mobile device, and/or the order of the search results, can differ between devices. In one embodiment of the invention, each list is sorted based on the sum of the distances of each search result from each mobile device presenting the list, such that instances requiring the least amount of combined travel for both mobile device users are presented earlier in the list than those requiring greater amounts of combined travel.

However, in an alternative embodiment of the invention, each mobile device presents both (a) a list of search results that are within a specified distance of that mobile device and (b) a separate list of search results that are within a specified distance of the other mobile device participating in the cooperative search. For example, a first list can include the three criteria-matching instances that are closest to a first of the mobile devices, while a second list can include the three criteria-matching instances that are closest to a second of the mobile devices. It is possible that these lists might not contain the same search results, although some overlap can occur if the mobile devices are close enough in proximity and if the search radius is sufficiently large. Even though each list might contain different and potentially non-overlapping search results, in one embodiment of the invention, the pair of lists that each mobile device presents to its user is the same. Although in one embodiment of the invention the search results selected for each list are based on the distance of that result from a mobile device, in an alternative embodiment of the invention, the search results can be selected based on some other criterion, such as the average prices of products sold at the establishments represented by the search results.

Although in one embodiment user selection of a user interface element causes a cooperative search of the kind discussed above to be initiated, in alternative embodiments of the invention, other actions may cause such a cooperative search to be initiated. For example, in one embodiment of the invention, a mobile device user can interact vocally with a voice-recognizing software agent executing on his mobile device in order to cause his mobile device to initiate such a cooperative search.

Although in one embodiment of the invention a cooperative search is initiated at a pair of mobile devices that are currently in a communication session with each other, in an alternative embodiment of the invention, the mobile devices engaging in the cooperative search do not need to be participating in a communication session in order to initiate the cooperative search. For example, in one embodiment of the invention, a first mobile device user selects a second mobile device user from a contact list stored on the first mobile device. In response to this selection, the first mobile device causes the second mobile device to engage in a cooperative search with the first mobile device, even if the first and second mobile devices are not currently involved in a communication session with each other.

Figure 2:
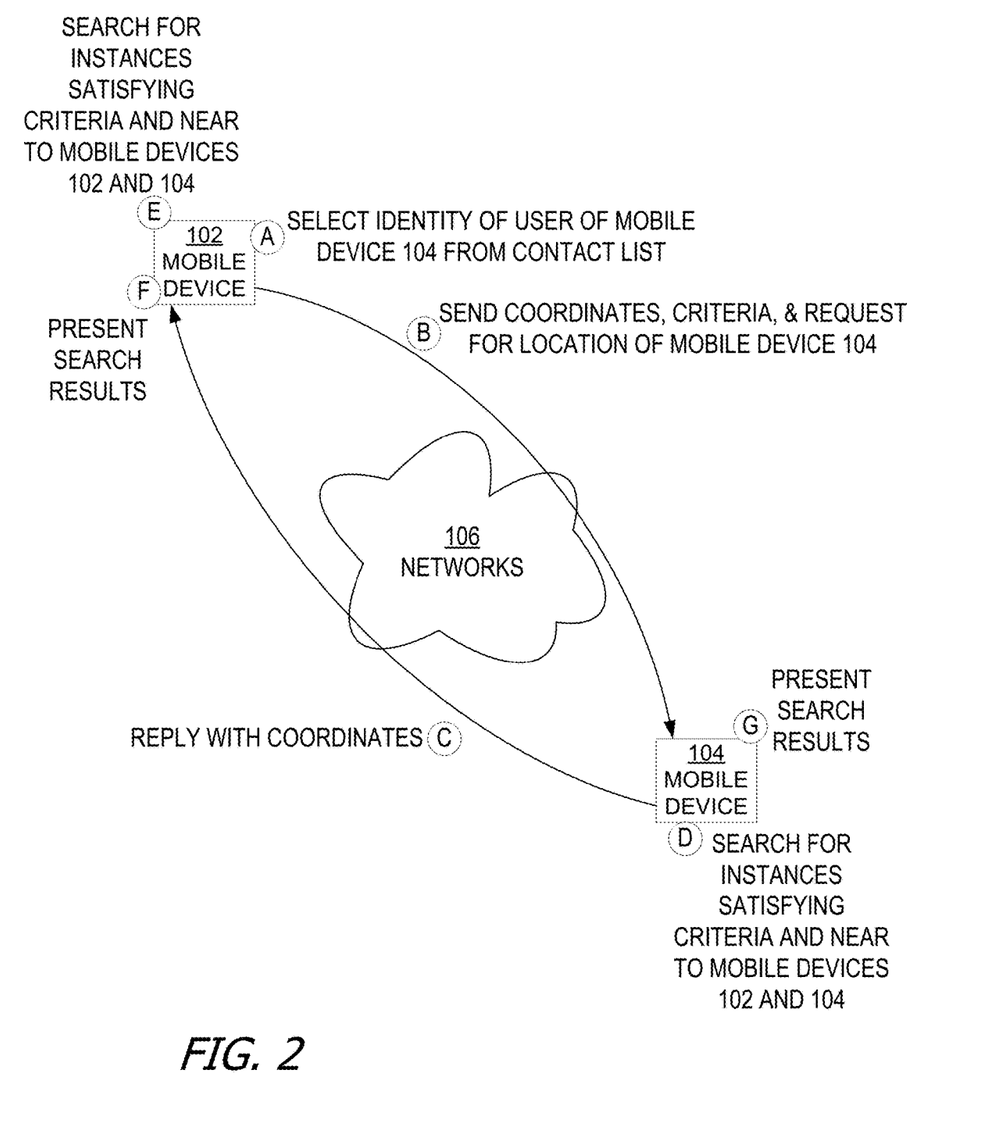
FIG. 2 is a block diagram illustrating an example of an interaction in which a pair of mobile devices can engage in order to perform a cooperative search for locations of interest, according to an embodiment of the invention.

FIG. 2 is a block diagram illustrating an example of an interaction in which a pair of mobile devices can engage in order to perform a cooperative search for locations of interest, according to an embodiment of the invention. In step A, a user of mobile device 102 can select an identity of a user of mobile device 104 from a contact list that is stored on mobile device 102. In step B, in response to the selection by the user of mobile device 102, mobile device 102 can send a request to mobile device 104. The request can indicate to mobile device 104 that mobile device 102 seeks to obtain the current location of mobile device 104. In one embodiment of the invention, the request can pass through one or more networks 106 and/or the Internet in traveling from mobile device 102 to mobile device 104. Networks 106 can include one or more wireless networks, which may include one or more cellular 3G networks or cellular 4G networks or one or more WiFi networks.

In one embodiment of the invention, both mobile device 102 and mobile device 104 can include global positioning systems (GPS) that permit those mobile devices to determine their current geographical coordinates. In alternative embodiments of the invention, mobile devices 102 and 104 can determine or approximate their geographical coordinates using other techniques, such as through cell phone tower signal triangulation, or through Internet Protocol (IP) address information associated with WiFi access points with which the mobile devices are respectively communicating. In one embodiment of the invention, the request that mobile device 102 sends to mobile device 104 in step B indicates the geographical coordinates of mobile device 102, as determined by mobile device 102.

In step C, mobile device 104 can receive the request from mobile device 102, can determine its own geographical coordinates using any technique potentially including those discussed above, and can send a response back to mobile device 102. The response can indicate the geographical coordinates of mobile device 104. Mobile device 104 can send the response back to mobile device 102 over networks 106.

In one embodiment of the invention, mobile device 104 can access security settings locally stored on mobile device 104 to ascertain that mobile device 102 is authorized to receive the geographical coordinates of mobile device 102 prior to sending the response; if mobile device 102 is not so authorized (e.g., if the user of mobile device 102 is not identified within a contact list of mobile device 104, or if mobile device 104 is configured to refuse all such requests for geographical coordinates), then mobile device 104 can ignore the request or return a refusal to mobile device 102.

In one embodiment of the invention, the request that mobile device 102 sends to mobile device 104 in step B can indicate one or more criteria that instances of establishments and/or geographical features need to satisfy in order to be included within search results. In step D, mobile device 104 can initiate a search for such instances that satisfy the indicated criteria. In addition to other criteria, the search criteria can include a criterion that the search results be within a specified distance of mobile device 104. In one embodiment of the invention, in addition to other criteria, the search criteria also can include an additional criterion that the search results also be within a specified distance of mobile device 102. Thus, in one embodiment of the invention, mobile device 104 can initiate a search for instances that satisfy the specified criteria (e.g., establishment type, average product cost, etc.) and that are also within a specified distance of each of mobile devices 102 and 104 (e.g., within a 5 mile radius of each). In performing this search, mobile device 104 can use its own self-determined geographical coordinates and, in one embodiment, the geographical coordinates that mobile device 102 indicated in the request sent in step B.

In step E, mobile device 102 can receive the response that mobile device 104 sent in step C, and, concurrently with step D, mobile device 102 can also initiate a search for instances that satisfy the specified criteria. In one embodiment of the invention, mobile device 102 can search for criteria-satisfying instances that are within a specified distance of mobile device 102, without regard to whether those instances are within the specified distance of mobile device 104. However, in an alternative embodiment, mobile device 102 can search instead for criteria-satisfying instances that are within the specified distance of both mobile devices 102 and 104. In performing this search, mobile device 102 can use its own self-determined geographical coordinates and, in one embodiment, the geographical coordinates that mobile device 104 indicated in the response sent in step C.

Beneficially, the foregoing technique avoids the need for the users of either of mobile devices 102 and 104 to communicate their locations to each other manually, such as through vocal description over a voice call or through textual description within a text messaging session. Because the geographical coordinates determined by each of mobile devices 102 and 104 are likely to be more precise than those that could be estimated by the human users of mobile devices 102 and 104, the automatic exchange of machine-determined geographical coordinates can help avoid confusion and frustration, and can save considerable time in the process of determining a meeting place that is reasonably near to both users. Thus, notably, in certain embodiments of the invention, the users of mobile devices 102 and 104 do not ever enter or otherwise specify their geographical locations manually.

In steps F and G, mobile devices 102 and 104 can respectively present the results of their searches to the users of those mobile devices. As is discussed above, in one embodiment, the results can include a pair of lists: one list of instances that are within a specified distance of mobile device 102, and one list of instances that are within a specified distance of mobile device 104. However, as is also discussed above, in an alternative embodiment, the results can include a list of instances that are each within a specified distance of both of mobile devices 102 and 104; in such an alternative embodiment, mobile devices 102 and 104 can attempt to determine criteria-satisfying instances that are geographically intermediate between the devices. Mobile devices 102 and 104 can present the search results to their respective users upon visual displays of those mobile devices and/or through other techniques such as audible synthesized speech. Additionally or alternatively, mobile devices 102 and 104 can automatically transmit the search results to other devices with which those devices are tethered or wirelessly communicating. For example, mobile devices 102 and 104 can automatically transmit the search results to vehicular navigation systems of automobiles in with their users are currently driving, for use by those vehicular navigation systems.

Although embodiments of the invention discussed above refer to mobile devices 102 and 104, in alternative embodiments of the invention, devices other than mobile devices can use the same or similar techniques in order to exchange geographical coordinates automatically and to conduct cooperative searches for criteria-satisfying instances that are within mutual distances of those devices. For example, desktop computers, laptop computers, computing tablets, and/or digital music players can use these techniques. Different types of devices can employ the foregoing techniques relative to each other; the devices do not need to be of the same type.

In certain embodiments discussed above, mobile devices 102 and 104 determine and exchange their geographical coordinates due to requests and responses exchanged between those devices, and potentially due to a human user's command to cause one of those mobile devices to initiate such an exchange. However, in an alternative embodiment of the invention, mobile devices 102 and 104 (and potentially other devices not shown in FIG. 1) can periodically send determine and send their geographical coordinates over networks 106 to a server (not shown in FIG. 1). Mobile devices 102 and 104 (and potentially other devices not shown in FIG. 1) can periodically, or in response to a user's request, query such a server over networks 106 in order to obtain the last self-reported geographical coordinates of some other device, without directly contacting that device itself. Mobile devices 102 and 104 also can cache the last obtained location of other devices. In an alternative embodiment, such a server can perform the cooperative search discussed above based on known locations of mobile devices 102 and 104, and can return the search results to mobile devices 102 and 104 over networks 106.

Furthermore, although certain embodiments of the invention describe the foregoing technique with reference to just two mobile devices 102 and 104, in alternative embodiments of the invention, more than two mobile devices may automatically exchange self-determined geographical coordinates with each other and participate in a cooperative search for criteria-satisfying instances using variants of the techniques discussed above.

There are a multitude of potential specific applications in which the foregoing techniques can be employed. For example, mobile device 102 can send, to mobile device 104, a request to visit a shopping establishment (e.g., a grocery store) having a specified name in order to purchase a specified product en route from the current location of mobile device 104 to the current location of mobile device 104. This might occur in the context of one spouse calling the other spouse on the latter spouse's commute home from work, for example. Under such circumstances, mobile device 104 can use the automatically received geographical coordinates of mobile device 102, as well as the automatically determined current geographical coordinates of mobile device 104, to find an establishment that (a) has the specified name and (b) lies within a specified distance of both mobile device 102 and mobile device 104. If the specified distance is restricted sufficiently, then the search results that mobile device 104 produces will only contain instances of the establishment that are located on some route in between the current location of mobile device 104 and mobile device 102. Thus, the user of mobile device 104 can automatically be notified of instances of the specified establishment that can be reached on his way home to the user of mobile device 102.

In one alternative embodiment of the invention, the search is restricted not by, or not only by, specified distance, but also or instead based on automatically determined drivable routes from the current location of mobile device 104 to the current location of mobile device 102; in such an alternative embodiment, the search results can exclude instances that do not lie on such drivable routes or that do not lie within a specified distance of some point on such drivable routes.

In another potential application of the foregoing techniques, mobile devices 102 and 104 can determine which of those mobile devices is currently closest to a specified geographical location at a specified time. For example, mobile device 102 can initiate a process by which the current geographical location of mobile device 104 is automatically determined, and then mobile device 102 (and potentially mobile device 104 also) can determine which of mobile devices 102 and 104 is currently closest to some specified establishment (e.g., a dry cleaner) or other geographical feature. In this manner, spouses might use their specified mobile devices in an automated fashion in order to determine which of them ought to pick up clothes from the dry cleaner at a specified time, for example. Each of mobile devices 102 and 104 may present, to its user, information indicating the current distance of each of those mobile devices from the specified geographical location to be visited. Such a process may be initiated via a user's interaction with a voice-recognizing automated agent executing on either of the mobile devices, for example, or automatically in response to the time-based triggering of a reminder in either of the mobile devices' stored reminder lists. Such a reminder can be a shared reminder that was created as such within both mobile devices 102 and 104 simultaneously in response to some earlier event. Under such circumstances, the time-based triggering of the shared reminder can cause both mobile devices 102 and 104 to initiate the coordinate exchange and distance determination described above. Reminders can be triggered in response to events other than time-based events, also. For example, a reminder may be automatically triggered at one or both of mobile devices 102 and 104 in response to one or the other entering or exiting a specified geo-fenced area.

In another potential application of a variant of the foregoing techniques, a former location of one of mobile devices 102 and 104 can be used rather than a current location of that mobile device. In one embodiment of the invention, as mobile device 102 travels from one location to another, mobile device 102 can automatically (or in response to an express command by the user of mobile device 102) query mobile device 104 to determine whether mobile device 104 has ever been within a specified distance of the current location of mobile device 102. In one embodiment of the invention, mobile device 104 maintains a history of geographical locations that mobile device 104 has visited (e.g., in the past year or even longer). For example, mobile device 104 can be configured to store geo-tagging information in conjunction with the performance of certain operations such as photography. If so, then mobile device 104 can maintain, within the memory of mobile device 104 (or external to mobile device 104 on a cloud-based server, for example), a set of photographs that mobile device 104 tagged with its current geographical coordinates at the time that each of those photographs was taken. In one embodiment of the invention, in response to a query of the kind discussed above, mobile device 104 returns, to mobile device 102 through networks 106, a list of geographical coordinates that mobile device 104 has previously visited that are within a specified distance of the current location of mobile device 102. In selecting the coordinates to be returned in the response, mobile device 104 can use the current geographical coordinates of mobile device 102 that mobile device 102 self-determined and indicated within the query.

Along with the selected geographical coordinates that are pertinent to the current location of mobile device 102, mobile device 104 can also send information that is associated with those selected geographical coordinates. For example, if the geographical coordinates are those with which photographs are tagged, then mobile device 104 can also send those photographs (or thumbnails thereof) to mobile device 102 over networks 106. Mobile device 102 can receive those photographs and present them to the user of mobile device 102. In this manner, the user of mobile device 102 can automatically benefit from the prior experience of the user of mobile device 104 in visiting the same location, thereby potentially enhancing the opportunities for the former user's visit to that location. For example, if the user of mobile device 104 has previously visited some tourist attraction such as Hawaii, then the techniques discussed above can be used to inform, automatically, the user of mobile device 102 of locations in Hawaii that might be of particular interest to the user of mobile device 102. In one embodiment of the invention, mobile device 102 presents, to its user, a map showing geographical points corresponding to each of the selected coordinates received from mobile device 104.

In yet another potential application of a variant of the foregoing techniques, a first mobile device can query a plurality of other mobile devices in an attempt to determine which of those other mobile devices is currently closest to the first mobile device. Such an application can be especially useful in emergency situations, for example, when a user of the first mobile device is in need of urgent assistance, and would like the closest of his friends or known contacts to assist him if possible. In one embodiment of the invention, in response to a command from a user of mobile device 102 to mobile device 104, mobile device 102 can send a request of the kind discussed above to multiple other mobile devices concurrently. In a manner similar to that described above, each of these other mobile devices can self-determine its current location and can respond to mobile device 102 with a response indicating that current location. Mobile device 102 can receive multiple responses from the queried mobile devices, and, based on the current locations of each of the responding mobile devices as well as its own self-determined geographical location, mobile device 102 can determine which of the responding mobile devices is currently closest to mobile device 102. In response to such a determination, mobile device 102 can present, to the user of mobile device 102, information identifying the closest of the responding mobile devices and/or a list of the responding mobile devices and their current distances from mobile device 102 ordered by distance from mobile device 102.

In one embodiment of the invention, mobile device 102 can automatically transmit an emergency help request to the nearest of the responding mobile devices, or to one of the responding mobile devices that the user of mobile device 102 selects from a list of the responding mobile devices. The emergency help request can inform the recipient mobile device of the current location of mobile device 102. The recipient mobile device can present, to its user, information indicating an automatically determined route to the current location of mobile device from the location of the recipient mobile device, along with information specifying details about the urgent need of the user of mobile device 102.

In an alternative embodiment of the invention, a variant of the above technique can be used to determine which of a plurality of mobile device users is currently the closest to some specified geographical feature or establishment other than mobile device 102. For example, a variant of the foregoing technique may be used to determine which of a plurality of mobile device users is currently located the closest to a specified store from which party supplies need to be purchased. In such an alternative embodiment, instead of querying the plurality of other mobile devices to determine which of those other mobile devices is closest to mobile device 102, mobile device 102 can query the plurality of other mobile devices to determine which of those other mobile devices is closest to a geographical feature, establishment, or coordinates expressly specified by the user of mobile device 102.

Figure 3:
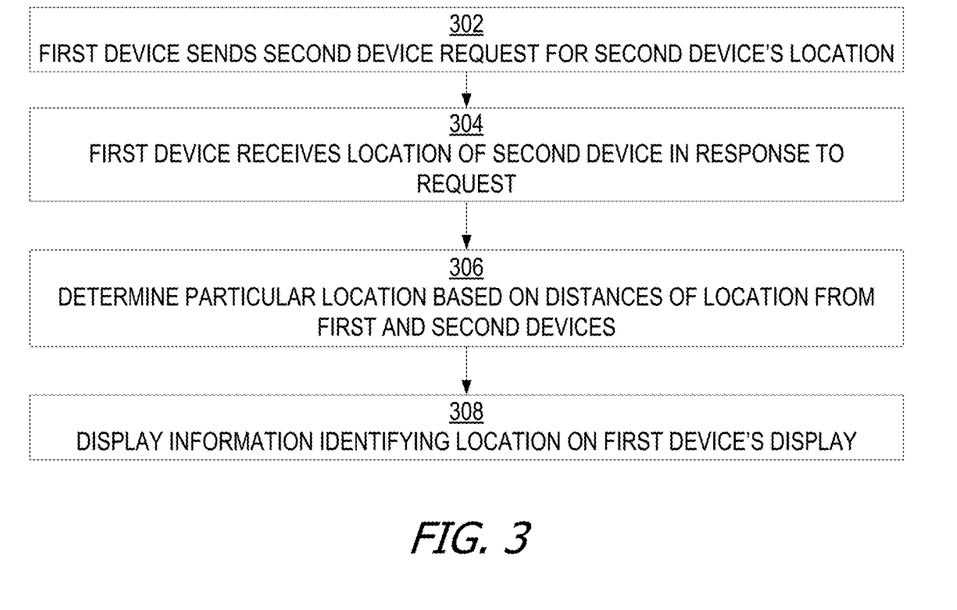
FIG. 3 is a flow diagram illustrating an example of technique for determining a particular location based on distances of multiple computing devices from that particular location, according to an embodiment of the invention.

FIG. 3 is a flow diagram illustrating an example of technique for determining a particular location based on distances of multiple computing devices from that particular location, according to an embodiment of the invention. In block 302, a first computing device sends, to a second computing device, a request for a location of the second computing device. In an alternative embodiment, this request can instead be sent to a server other than the second computing device. In block 304, in response to the request, the first computing device receives information indicating the location of the second computing device, which the second computing device determined using a global positioning system mechanism of the second computing device in response to receiving the request. In block 306, based at least in part on both (a) a distance of the particular location from a location of the first computing device and (b) a distance of the particular location from the location of the second computing device, a particular location is determined. In block 308, information identifying the particular location is displayed, on a display of the first computing device.

Figure 4:
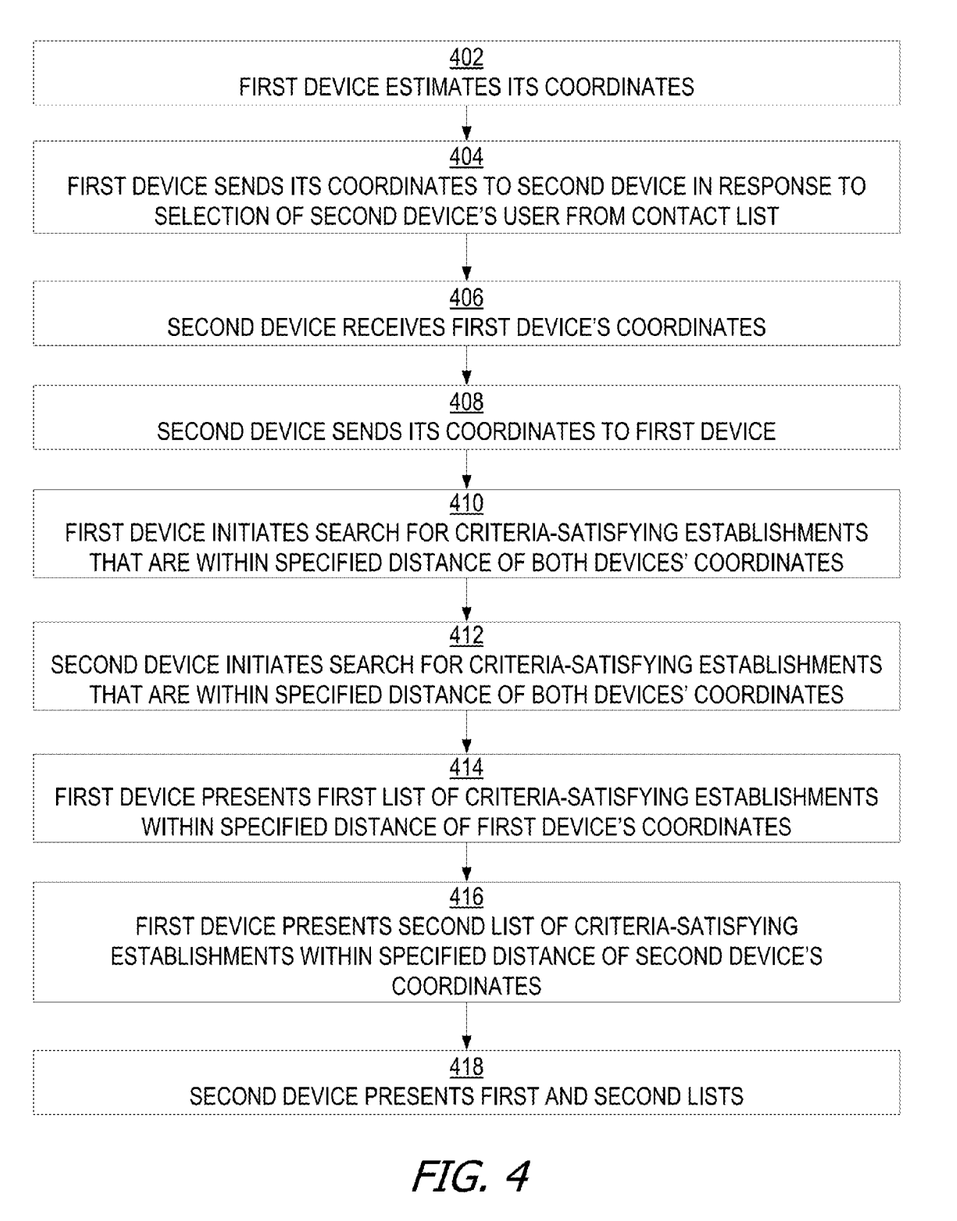
FIG. 4 is a flow diagram illustrating an example of technique for performing a search based on geographical coordinates of multiple computing devices, according to an embodiment of the invention.

FIG. 4 is a flow diagram illustrating an example of technique for performing a search based on geographical coordinates of multiple computing devices, according to an embodiment of the invention. In block 402, a first computing device automatically estimates first geographical coordinates of the first computing device based on (a) a global positioning system incorporated in the first computing device, (b) cellular telephone signals received by the first computing device, or (c) an Internet Protocol address of a WiFi access point with which the first computing device is communicating. In an embodiment, the first computing device does not receive the first geographical coordinates from any human user. In block 404, a first computing device sends first geographical coordinates of the first computing device toward a second computing device in response to a user's selection of an identity of a user of the second computing device from a list of contacts maintained by the first computing device. Alternatively, the first computing device can send first geographical coordinates of the first computing device toward the second computing device in response to the first computing device receiving specified user input while the first computing device is involved in a communication session with the second computing device. In block 406, the second computing device receives the first geographical coordinates from the first computing device. In block 408, the second computing device sends second geographical coordinates of the second computing device toward the first computing device automatically in response to receiving the first geographical coordinates. In block 410, the first computing device initiates a search for establishments satisfying specified criteria that lie within a specified distance of both the first geographical coordinates and the second geographical coordinates in response to receiving the second geographical coordinates. In block 412, the second computing device initiates a particular search based at least in part on both the first geographical coordinates and the second geographical coordinates in response to receiving the first geographical coordinates. The particular search can be for establishments satisfying the specified criteria that lie within the specified distance of both the first geographical coordinates and the second geographical coordinates. In block 414, the first computing device presents a first list of locations satisfying specified criteria that lie within a specified distance of the first geographical coordinates. In block 416, the first computing device presents a second list of locations satisfying the specified criteria that lie within the specified distance of the second geographical coordinates. In block 418, the second computing device presents both the first list and the second list.

Figure 5:
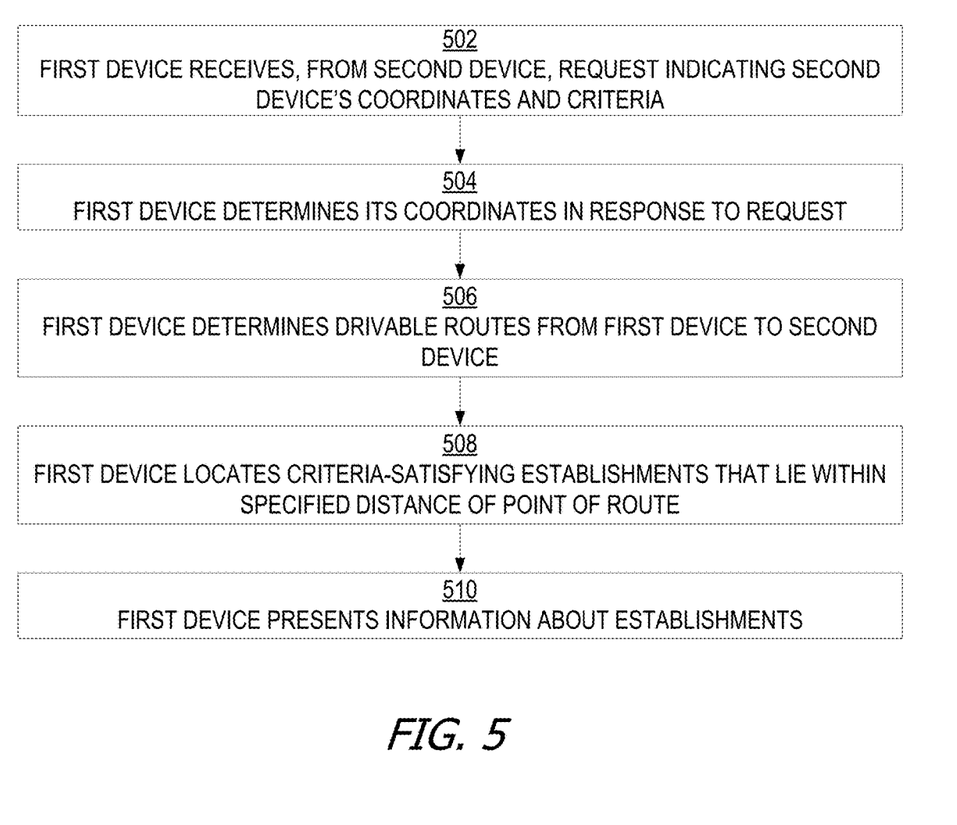
FIG. 5 is a flow diagram illustrating an example of technique for performing a search based on drivable routes between geographical coordinates of multiple computing devices, according to an embodiment of the invention.

FIG. 5 is a flow diagram illustrating an example of technique for performing a search based on drivable routes between geographical coordinates of multiple computing devices, according to an embodiment of the invention. In block 502, a first computing device receives, from a second computing device, a request indicating both (a) geographical coordinates of the second computing device and (b) one or more criteria specified by the second computing device. In an embodiment, the request indicates geographical coordinates of the second computing device that the second computing device estimated based on at least one of: (a) a global positioning system incorporated in the second computing device, (b) cellular telephone signals received by the second computing device, or (c) an Internet Protocol address of a WiFi access point with which the second computing device is communicating. In block 504, in response to receiving the request, the first computing device automatically determines geographical coordinates of the first computing device using only a global positioning system of the first computing device, without reference to any human input regarding a location of the first computing device. In block 506, the first computing device automatically determines one or more drivable routes from the coordinates of the first computing device to the coordinates of the second computing device. In block 508, the first computing device automatically locates one or more establishments that are each within a specified distance of a point occurring along the one or more drivable routes and also satisfy the one or more criteria. In block 510, in response to locating the one or more establishments, the first computing device presents information about the one or more establishments.

Figure 6:
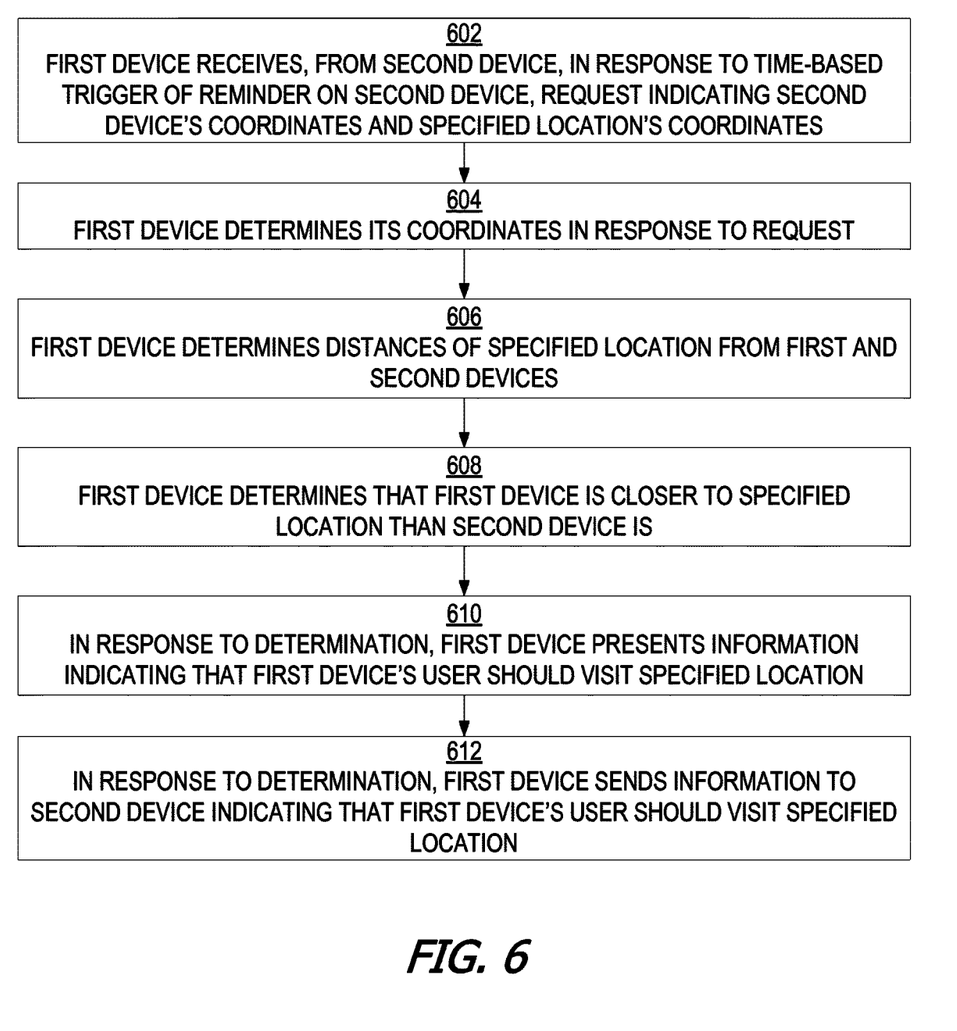
FIG. 6 is a flow diagram illustrating an example of technique for determining, based on geographical coordinates of multiple computing devices, which user of one of the multiple computing devices should visit a particular location, according to an embodiment of the invention.

FIG. 6 is a flow diagram illustrating an example of technique for determining, based on geographical coordinates of multiple computing devices, which user of one of the multiple computing devices should visit a particular location, according to an embodiment of the invention. In block 602, a first computing device receives, from a second computing device, in response to a time-based triggering of a reminder stored on the second computing device, a request indicating both (a) geographical coordinates of the second computing device and (b) geographical coordinates of a specified location. In block 604, in response to receiving the request, the first computing device automatically determines geographical coordinates of the first computing device. In block 606, based at least in part on the geographical coordinates of the first and second computing devices, the first computing device automatically determines (1) a first distance of the specified location from the first computing device and (2) a second distance of the specified location from the second computing device. In block 608, the first computing device determines, based at least in part on the first and second distances, that the first computing device is currently closer to the specified location than the second computing device is. In block 610, in response to determining that the first computing device is currently closer to the specified location than the second computing device is, the first computing device presents, to a user, information that indicates that the user should visit the specified location. In block 612, in response to determining that the first computing device is currently closer to the specified location than the second computing device is, the first computing device sends, to the second computing device, information that indicates that a user of the first computing device should visit the specified location.

Figure 7:
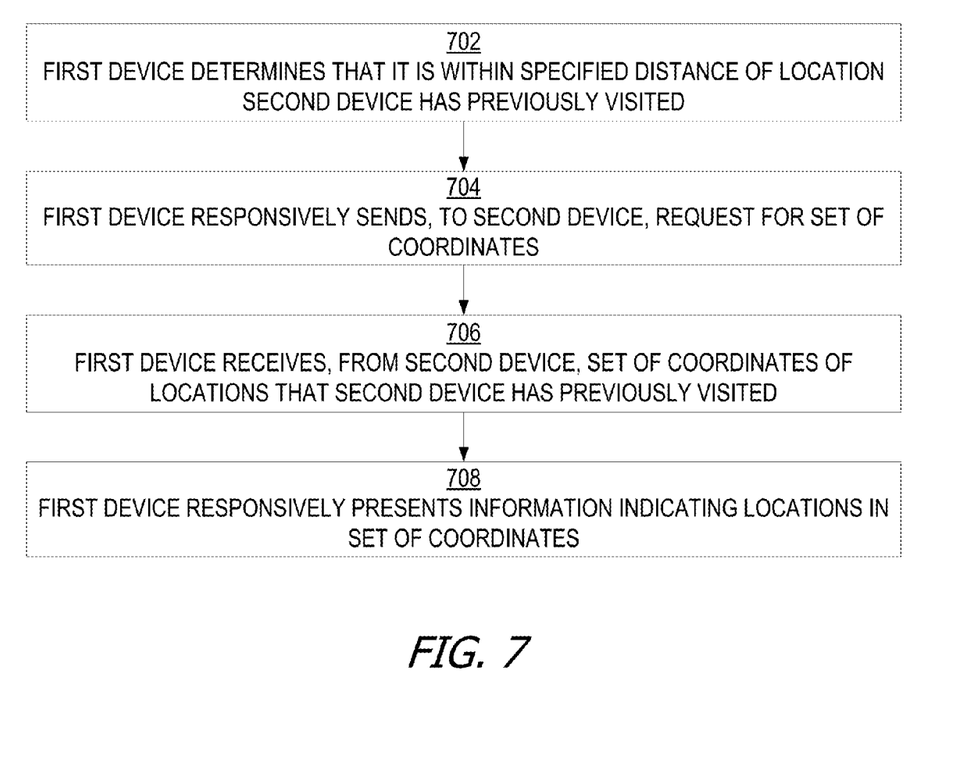
FIG. 7 is a flow diagram illustrating an example of technique for presenting information at a first computing device based on locations previously visited by a second computing device, according to an embodiment of the invention.

FIG. 7 is a flow diagram illustrating an example of technique for presenting information at a first computing device based on locations previously visited by a second computing device, according to an embodiment of the invention. In block 702, a first computing device automatically determines that the first computing device is currently within a specified distance of at least one location that a second computing device has previously visited. In block 704, in response determining that the first computing device is currently within the specified distance of the at least one location that the second computing device has previously visited, the first computing device automatically sends, to the second computing device, a request for a set of geographical coordinates. In block 706, the first computing device receives, from the second computing device, a set of geographical coordinates that represent locations that the second computing device previously visited. In block 708, in response to receiving the set of geographical coordinates from the second computing device, the first computing device presents information that indicates locations corresponding to geographical coordinates in the set of geographical coordinates.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
   determining, by a first computing device, that the first computing device is currently within a specified distance of a location that a second computing device has previously visited;
   sending, by the first computing device, a request for a set of geographical coordinates that the second computing device has previously visited;
   receiving, at the first computing device, the set of geographical coordinates that the second computing device has previously visited; and
   in response to receiving the set of geographical coordinates, presenting, by the first computing device, information that indicates locations corresponding to the geographical coordinates in the set of geographical coordinates.

2. The method of claim 1, wherein the request for the set of geographical coordinates that the second computing device has previously visited is sent when the first computing device is currently within the specified distance of the location that the second computing device has previously visited.

3. The method of claim 1, wherein determining that the first computing device is currently within the specified distance of the location includes:
   querying, by the first computing device, the second computing device to determine whether the second computing device has ever been within the specified distance of the current location of the first computing device, wherein the first computing device is determined to be currently within the specified distance of the location based on results of the querying.

4. The method of claim 3, wherein querying the second computing device comprises querying the second computing device in response to receiving, at the first computing device, a command from a user of the first computing device.

5. The method of claim 3, wherein querying the second computing device comprises querying the second computing device in response to the first computing device travelling from one location to another location.

6. The method of claim 3, wherein querying the second computing device comprises querying a history of previously visited geographical locations maintained by the second computing device.

7. The method of claim 6, wherein the history of previously visited geographical locations maintained by the second computing device comprises geo-tagging information that the second computing device stored in conjunction with the performance of photography.

8. The method of claim 1, wherein determining that the first computing device is currently within the specified distance of the location includes:
   querying, by the first computing device, a set of photographs that the second computing device tagged with geographical locations at times that the second computing device took the photographs, to determine whether the second computing device has ever been within the specified distance of the current location of the first computing device, wherein the first computing device is determined to be currently within the specified distance of the location based on results of the querying.

9. The method of claim 8, wherein the set of photographs are maintained on a cloud-based server that is external to the second computing device.

10. The method of claim 1, further comprising:
    determining, by the first computing device using a global positioning mechanism of the first computing device, a current location of the first computing device; and
    sending the current location of the first computing device to the second computing device along with the request for the set of geographical coordinates;
    wherein the set of geographical coordinates is a list of particular geographical coordinates that the second computing device selected due to the particular geographical coordinates being within a specified distance of the current location of the first computing device.

11. The method of claim 1, wherein presenting, by the first computing device, information that indicates locations corresponding to the geographical coordinates in the set of geographical coordinates comprises presenting a map showing geographical points corresponding to the geographical coordinates.

12. The method of claim 1, further comprising:
    receiving, at the first computing device, from the second computing device, photographs that are tagged with geographical coordinates in the set of geographical coordinates that the second computing device has previously visited; and
    presenting the photographs by the first computing device.

13. The method of claim 1, wherein the second computing device is associated with a second mobile device user from a contact list of the first computing device.

14. A computer-readable memory storing instructions executable by one or more processors to cause the one or more processors to perform:
    automatically determining, by a first computing device, that the first computing device is currently within a specified distance of a location that a second computing device has previously visited;
    in response to the first computing device determining that the first computing device is currently within the specified distance of the location that the second computing device has previously visited, sending, from the first computing device to the second computing device, a request for a set of geographical coordinates that the second computing device has previously visited;
    receiving, at the first computing device, the set of geographical coordinates that the second computing device has previously visited; and
    in response to receiving the set of geographical coordinates, presenting, by the first computing device, information that indicates locations corresponding to the geographical coordinates in the set of geographical coordinates.

15. The computer-readable memory of claim 14, wherein determining that the first computing device is currently within the specified distance of the location includes:
    querying, by the first computing device, the second computing device to determine whether the second computing device has ever been within the specified distance of the current location of the first computing device, wherein the first computing device is determined to be currently within the specified distance of the location based on results of the querying.

16. The computer-readable memory of claim 15, wherein querying the second computing device comprises querying the second computing device in response to receiving, at the first computing device, a command from a user of the first computing device.

17. The computer-readable memory of claim 15, wherein querying the second computing device comprises querying the second computing device in response to the first computing device travelling from one location to another location.

18. The computer-readable memory of claim 15, wherein querying the second computing device comprises querying a history of previously visited geographical locations maintained by the second computing device.

19. The computer-readable memory of claim 18, wherein the history of previously visited geographical locations maintained by the second computing device comprises geotagging information that the second computing device stored in conjunction with the performance of photography.

20. The computer-readable memory of claim 14, wherein determining that the first computing device is currently within the specified distance of the location includes: H, wherein the instructions cause the one or more processors to perform:
- querying, by the first computing device, a set of photographs that the second computing device tagged with geographical locations at times that the second computing device took the photographs, to determine whether the second computing device has ever been within the specified distance of the current location of the first computing device, wherein the first computing device is determined to be currently within the specified distance of the location based on results of the querying.

21. The computer-readable memory of claim 20, wherein the set of photographs are maintained on a cloud-based server that is external to the second computing device.

22. The computer-readable memory of claim 14, wherein the instructions cause the one or more processors to perform:
- determining, by the first computing device using a global positioning mechanism of the first computing device, a current location of the first computing device; and
- sending the current location of the first computing device to the second computing device along with the request for the set of geographical coordinates;
- wherein the set of geographical coordinates is a list of particular geographical coordinates that the second computing device selected due to the particular geographical coordinates being within a specified distance of the current location of the first computing device.

23. The computer-readable memory of claim 14, wherein presenting, by the first computing device, information that indicates locations corresponding to the geographical coordinates in the set of geographical coordinates comprises presenting a map showing geographical points corresponding to the geographical coordinates.

24. The computer-readable memory of claim 14, wherein the instructions cause the one or more processors to perform:
- receiving, at the first computing device, from the second computing device, photographs that are tagged with geographical coordinates in the set of geographical coordinates that the second computing device has previously visited; and presenting the photographs by the first computing device.

25. A system comprising:
one or more processors; and
a memory coupled to the one or more processors, wherein the memory is encoded with a set of instructions which when executed causes the one or more processors to perform a process comprising:
- determining, by a first computing device, that the first computing device is currently within a specified distance of a location that a second computing device has previously visited;
- sending, by the first computing device, a request for a set of geographical coordinates that the second computing device has previously visited;
- receiving, at the first computing device, the set of geographical coordinates that the second computing device has previously visited; and
- in response to receiving the set of geographical coordinates, presenting, by the first computing device, information that indicates locations corresponding to the geographical coordinates in the set of geographical coordinates.

26. The system of claim 25, where the set of instructions further causes the one or more processors to perform the process comprising:
- selecting, by the first computing device, a second mobile device user from a contact list associated with the first computing device, wherein the second mobile device user is associated with the second computing device.

* * * * *

UNITED STATES PATENT AND TRADEMARK OFFICE
CERTIFICATE OF CORRECTION

PATENT NO. : 9,619,532 B2  
APPLICATION NO. : 14/602194  
DATED : April 11, 2017  
INVENTOR(S) : Dave et al.

Page 1 of 1

It is certified that error appears in the above-identified patent and that said Letters Patent is hereby corrected as shown below:

In the Claims

Claim 20, Line 3 (Column 17, Line 15):
Delete "H, wherein the instructions cause the one or more processors to perform:".

Signed and Sealed this  
Seventeenth Day of April, 2018

Andrei Iancu  
*Director of the United States Patent and Trademark Office*